United States Patent [19]

Hasebe

[11] Patent Number: 5,050,097

[45] Date of Patent: Sep. 17, 1991

[54] BOUNDARY DETECTOR AND GRAPHIC PROCESSING SYSTEM INCORPORATING THE SAME

[75] Inventor: Kouki Hasebe, Tokyo, Japan

[73] Assignee: Kabushiki Kaisha Toshiba, Kawasaki, Japan

[21] Appl. No.: 423,503

[22] Filed: Oct. 13, 1989

Related U.S. Application Data

[63] Continuation of Ser. No. 291,350, Dec. 29, 1988, abandoned, which is a continuation of Ser. No. 55,596, May 29, 1987, abandoned.

[30] Foreign Application Priority Data

May 31, 1986 [JP] Japan .............................. 61-126341
May 31, 1986 [JP] Japan .............................. 61-126342

[51] Int. Cl.$^5$ .............................................. G06K 9/39
[52] U.S. Cl. ...................................... 364/518; 382/56; 382/21; 340/706
[58] Field of Search ...................... 364/518, 521, 522; 340/750, 706; 382/17, 21, 22, 56

[56] References Cited

U.S. PATENT DOCUMENTS

| | | | |
|---|---|---|---|
| 3,987,412 | 10/1976 | Morrin, II | 340/146.3 AE |
| 4,545,067 | 10/1985 | Juvin et al. | 382/21 |
| 4,566,124 | 1/1986 | Yamamoto et al. | 382/21 |
| 4,696,049 | 9/1987 | Musso | 382/22 |
| 4,700,402 | 10/1987 | Okai et al. | 382/56 |
| 4,703,512 | 10/1987 | Saka et al. | 382/22 |

FOREIGN PATENT DOCUMENTS

| | | | |
|---|---|---|---|
| 0208180 | 9/1986 | Japan | 382/22 |
| 0221978 | 10/1986 | Japan | 382/17 |

OTHER PUBLICATIONS

Suciu et al., "Image Contour Extraction with Analog MOS Circuit Techniques", IEEE Journal of Solid State Circuits, vol. SC-12, No. 1, 2/77, pp. 65-72.

DiMeo et al., "Real Time Dynamic Boundary Recognition System", Proceedings of the Tenth Annual Northwest Bioengineering Conference, 3/82, pp. 320-326.

Holdermann et al., "Processing of Gray Scale Pictures'-'-Computer Graphics and Image Processing, 4/72, pp. 66-80.

Huntsberger et al., "Iterative Fuzzy Image Segmentation", Pattern Recognition, vol. 18, No. 2, pp. 131-138, 1985.

*Primary Examiner*—Dale M. Shaw
*Assistant Examiner*—Phu K. Nguyen
*Attorney, Agent, or Firm*—Finnegan, Henderson, Farabow, Garrett, and Dunner

[57] ABSTRACT

According to the boundary detector of this invention, in order to perform high-speed boundary detection processing for image data read out from a frame memory comprising a plurality of memory planes, image data having a predetermined unit data length, at identical positions from the plurality of memory planes in the frame memory, are compared, by a comparator, with input boundary condition data for a corresponding one of the plurality of memory planes, to produce boundary data. By using all the boundary data, a boundary bit position is detected according to input detection mode designation data, and boundary bit position data representing a detected boundary bit position is output. The boundary detector further includes a generator for generating the boundary data when it is used in boundary detection processing. However, when the boundary data is not used for this purpose, mask data selected on the basis of the memory plane designation data is output as the boundary data, by the generator. Therefore, the memory plane as an object subjected to boundary detection processing can be arbitrarily designated.

18 Claims, 5 Drawing Sheets

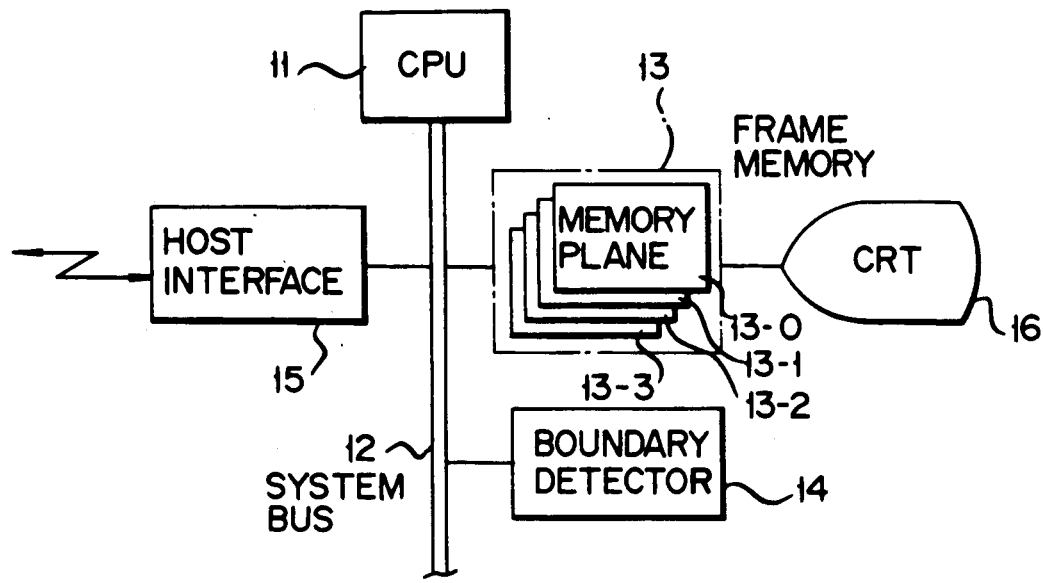
F I G. 1
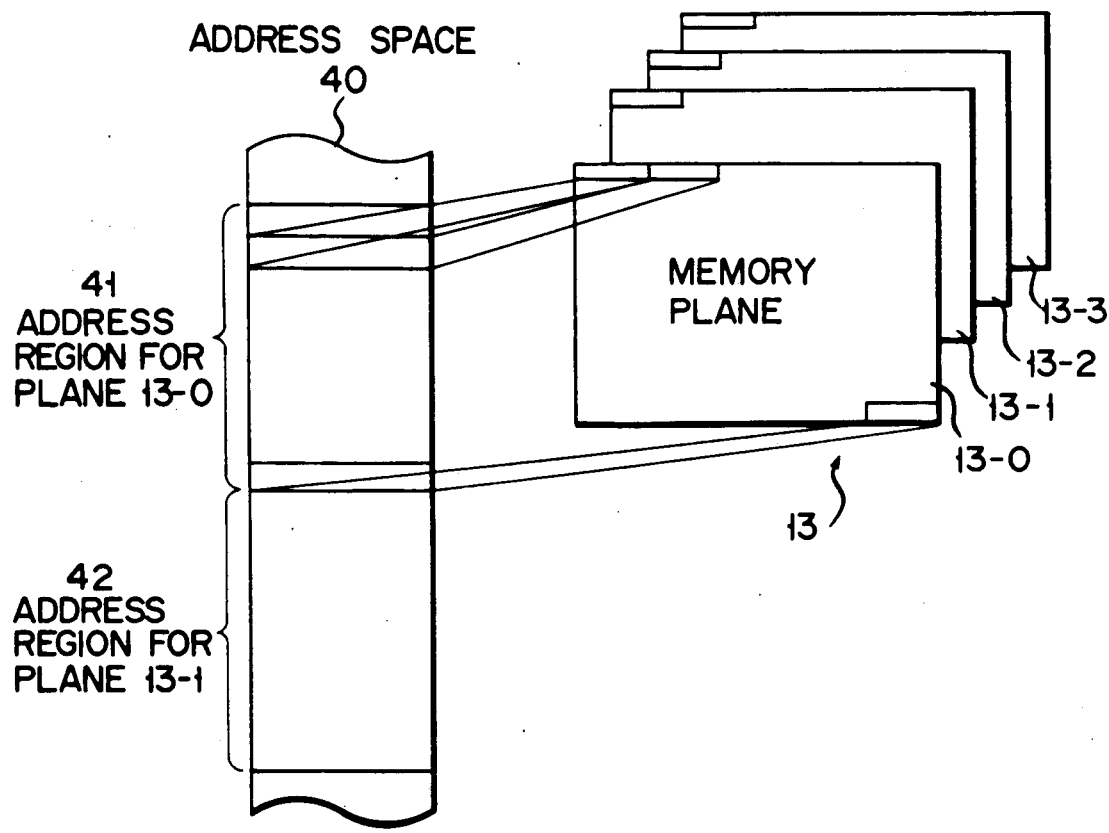
F I G. 2

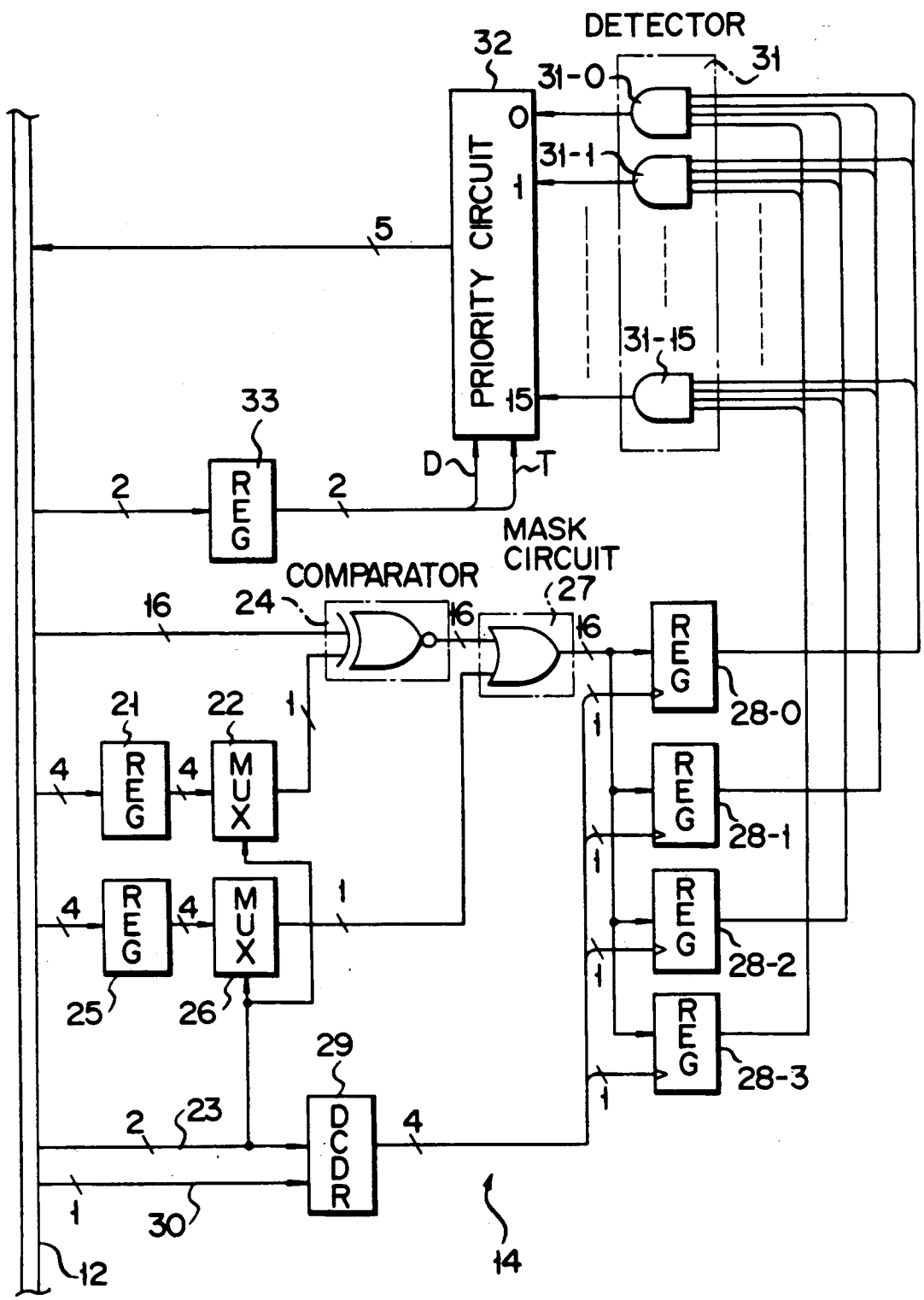
F I G. 3

FIG. 4A

| MSB | 15 | 14 | 13 | 12 | 11 | 10 | 9 | 8 | 7 | 6 | 5 | 4 | 3 | 2 | 1 | 0 | LSB |
|---|---|---|---|---|---|---|---|---|---|---|---|---|---|---|---|---|---|
|  | 0 | 0 | 0 | 0 | 0 | 0 | 0 | 0 | 0 | 0 | 0 | 0 | 0 | 0 | 0 | 0 |  |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 1 | 1 | 1 | 1 | 1 | 1 | 1 | 1 | 1 | 1 | 1 | 1 | 1 | 1 | 1 | 1 |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 0 | 1 | 0 | 1 | 1 | 0 | 0 | 1 | 1 | 1 | 0 | 1 | 1 | 1 | 1 |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 1 | 1 | 1 | 1 | 0 | 1 | 0 | 0 | 0 | 0 | 0 | 0 | 0 | 0 | 0 | 0 |

↑ T=0 D=0 : 10   T=0 D=1 : 0   T=1 D=0 : 15   T=1 D=1 : 9

BOUNDARY DETECTOR AND GRAPHIC PROCESSING SYSTEM INCORPORATING THE SAME

This application is a continuation, of application Ser. No. 07/291,350, filed Dec. 29, 1988 which is a continuation of application Ser. No. 07/055,596, filed May 29, 1987.

BACKGROUND OF THE INVENTION

The present invention relates to a boundary detector for performing high-speed boundary detection, and a bit-map graphic processing system incorporating the boundary detector.

Boundary detection is one of the functions required of a bit-map graphic processing system. Boundary detection is used in, for example, the painting of a designated closed region. Painting of a closed region in a conventional boundary graphic processing system of this type is performed in units of pixels, by use of an appropriate program. A typical example is an algorithm of program 3 shown in "Painting and Scan Conversion", Ono, Pixel No. 15, Dec. 1983, PP. 149-150. According to this technique, the program procedures of the microprocessor are set out in steps (1) to (4) as follows:

(1) The coordinates of a start point in boundary detection are stored in a stack;

(2) If the stack is empty, execution is completed. Otherwise, the coordinates are extracted from the stack and are defined as a start point;

(3) A segment including the start point is checked by referring to the right and left pixels of the start point in units of pixels, and the segment is painted; and (4) Pixels on the immediately upper and lower invention, a boundary detector is provided for performing high-speed boundary detection processing, comprising a generator for comparing input boundary condition data determined by the color of a predesignated pixel, with input image data having a predetermined unit data length, and for generating boundary data representing a comparison result, and a boundary detector for detecting a boundary pixel position from the boundary data output from the generating means, in accordance with input detection mode designation data, and for outputting boundary bit position data representing the detected boundary pixel position.

According to another embodiment of the present invention, a boundary detector is provided for performing high-speed boundary detection, on the basis of image data from a frame memory including a plurality of memory planes, which comprises a generator for generating boundary data from color image data of a predetermined unit data length, read out from the frame memory, in accordance with input boundary condition data. This color image data comprises monocolor image data, which corresponds to identical positions, for each of the plurality of memory planes of the frame memory. The present device also includes a boundary detector for detecting a boundary bit position derived from the boundary data, in accordance with input detection mode designation data, and for generating boundary bit position data representing the detected boundary bit position.

According to yet another embodiment of the present invention, a boundary detector is provided for performing high-speed boundary detection, on the basis of image data read out from a frame memory including a plurality of memory planes, which comprises a generator for generating boundary data from color image data of a predetermined unit data length, read out from the frame memory, and input mask data in accordance with input boundary condition data. This color image data comprises monocolor image data for the plurality of memory planes, the memory plane boundary data is generated for one of the plurality of memory planes to be subjected to the boundary detection processing, the mask data is generated as the memory plane boundary data for one of the plurality of memory planes not subjected to the boundary detection processing. The present device also includes a boundary detector for detecting, in accordance with input detection mode designation data, a boundary bit position derived from the boundary data generated by the generating means, and for outputting boundary bit position data indicating the detected boundary bit position.

In order to achieve the above objects of the present invention, there is also provided a boundary graphic processing system for performing high-speed boundary detection processing, comprising a frame memory for storing image data, display means for displaying the image data stored in the frame memory, a boundary detector for detecting a boundary bit position, on the basis of processing image data input thereto as units of predetermined data lengths, and for outputting boundary bit position data representing the detected boundary bit position in accordance with an input boundary detection control instruction. The present device also includes a controller for outputting the boundary detection control instruction to the boundary detecting means, in accordance with an input boundary detection instruction, as well as data concerning a predesignated pixel. The controller also reads out the processing image data from the frame memory, on the basis of a bit position of the predesignated pixel or the detected boundary bit position, and stores the detected boundary bit position when the boundary bit position data represents the presence of a boundary, and discriminates whether the stored boundary bit positions are continuous.

According to the present invention as described above, boundary detection can be performed for image data having a predetermined unit data length in the frame memory, and thus processing such as painting, which requires boundary detection, can be performed at high speed. In addition, a memory plane of interest and other memory planes can be designated in the course of boundary detection, and thus various boundary conditions can be set. Moreover, the addition of a new circuit arrangement to an existing bit-map graphic processing system realizes the present invention without the need to further modify the existing system.

BRIEF DESCRIPTION OF THE DRAWINGS

FIG. 1 is a block diagram showing a bit-map graphic processing system according to a first embodiment of the present invention;

FIG. 2 is a memory map showing an address space of the frame memory shown in FIG. 1;

FIG. 3 is a block diagram showing a detailed arrangement of the boundary detector shown in FIG. 1;

FIGS. 4A to 4D are views for explaining the operation of the priority circuit shown in FIG. 1;

PREFERRED EMBODIMENTS OF THE INVENTION

Figure 5:
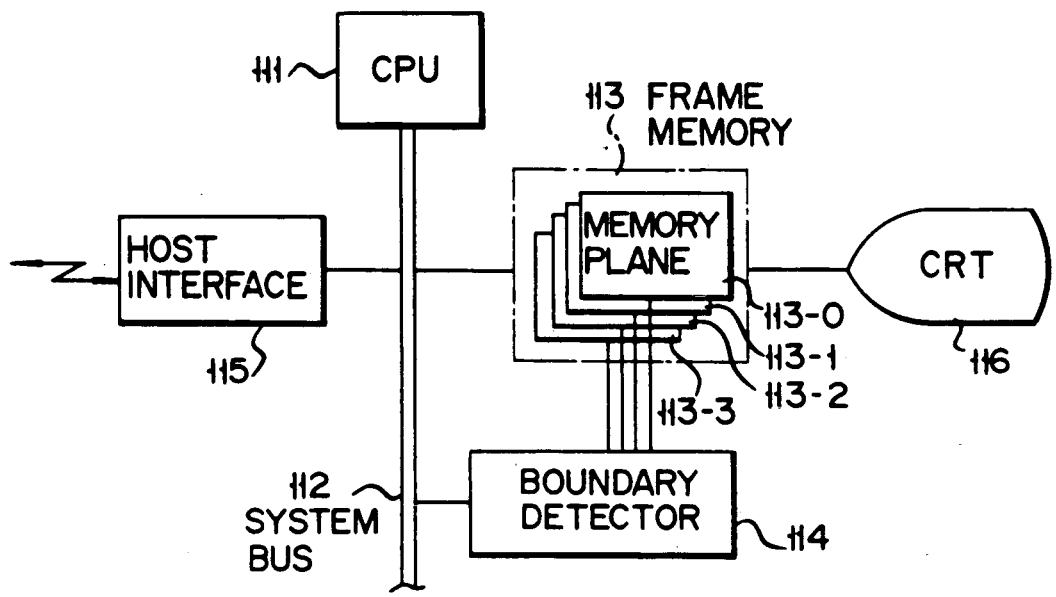
FIG. 5 is a block diagram of a boundary graphic processing system according to a second embodiment of the present invention.

Boundary detector and bit-map graphic processing systems incorporating the boundary detectors according to the present invention will be described with scanning lines are checked, one by one, within the range of the segment, the rightmost pixel constituting this segment is stored in the stack, and the flow returns to step (2).

According to this method, however, boundary detection is performed in units of pixels, and the processing time is inevitably prolonged.

SUMMARY OF THE INVENTION

The present invention has been conceived in consideration of the above situation, and has as its object to provide a boundary detector capable of executing boundary detection of image data in units of predetermined data lengths, thereby increasing the speed of boundary detection processing.

It is another object of the present invention to provide a boundary detector for performing high-speed boundary detection of a frame memory having a plurality of memory planes.

It is still another object of the present invention to provide a boundary detector which is capable of selecting at high speed a memory plane of interest in a frame memory having a plurality of memory planes.

It is yet another object of the present invention to provide a bit-map graphic processing system which is capable of performing high-speed boundary detection processing.

According to one embodiment of the present reference to the accompanying drawings.

A first embodiment of the invention will now be described, with reference to FIGS. 1 to 4D.

FIG. 1 is a block diagram of a bit-map graphic processing system incorporating a boundary detector according to the first embodiment of the present invention. Referring to FIG. 1, system bus 12 comprises a data bus, an address bus, and a control bus. System bus 12 is connected to CPU 11, host interface 15, frame memory 13, and boundary detector 14.

Frame memory 13 comprises R (red), G (green), B (blue), and BLK (black) memory planes 13-0 to 13-3. Memory planes 13-0 to 13-3 can be addressed in units of bits. FIG. 2 shows address space 40 associated with frame memory 13 in the bit-map graphic processing system employing a memory mapped I/O scheme. As shown in FIG. 2, the address regions corresponding to memory planes 13-0 to 13-3 are assigned to a continuous area of address space 40 which is supported by address data. Therefore, CPU 11 can access each pixel in each memory plane 13-i (i=0 to 3) in the same manner that CPU 11 accesses a main memory (not shown). When data representing a bit position is input, 16-bit image data having a start bit position designated by the input data is read out from frame memory 13. Image data stored in frame memory 13 can be read out and displayed on CRT 16.

Boundary detector 14 is used to detect a boundary using the 16-bit image data output from frame memory 13 in accordance with a boundary detection processing control instruction from CPU 11 during boundary detection processing such as painting. This operation will be described in detail later. Host interface 15 exchanges data with a host computer (not shown) in accordance with an instruction from CPU 11. If image data is sent from the host computer, the image data is stored in frame memory 13. CPU 11 controls the overall operations of the system.

The arrangement of the boundary detector shown in FIG. 1 will be described with reference to FIG. 3. Referring to FIG. 3, register (REG) 21 receives and stores 4-bit boundary condition data sent through system bus 12. The boundary condition data is predetermined by a color of a designated pixel and represents whether each pixel of the input image data serves as a boundary pixel of logic "0" or "1". The bits of the boundary condition data correspond to memory planes 13-0 to 13-3, respectively. The stored boundary condition data is supplied to multiplexer 22.

Multiplexer 22 also receives 2-bit memory plane designation data 23 for designating a memory plane to be accessed. Multiplexer 22 generates 1-bit boundary condition data selected on the basis of memory plane designation data 23, and the selected data is supplied to comparator 24.

Comparator 24 also receives 16-bit image data read out by CPU 11 from frame memory 13 and supplied through system bus 12. Comparator 24 comprises 16 exclusive-NOR (EX-NOR) gates. The ith (i=0 to 15) bit of the 16-bit image data from frame memory 13 is supplied to one terminal of each EX-NOR gate, and the bit boundary condition data selected by multiplexer 22 is input to the other input terminal of each EX-NOR gate. Each EX-NOR gate compares the corresponding input signals. If the input signals coincide with each other, the EX-NOR gate generates logic "1". Otherwise, it generates logic "0". Logic "1" or "0" is supplied as boundary data to mask circuit 27.

Register (REG) 25 receives and stores 4-bit mask data through system bus 12. The bits of the mask data determine whether corresponding image data from memory planes 13-0 to 13-3 are defined as data subjected to boundary detection processing. The bit mask data is set at logic "0" when the image data is read from the memory plane subjected to boundary detection processing. However, when the image data is read out from the memory plane not associated with boundary detection processing, the mask data is set at logic "1". The mask data stored in register 25 is output to multiplexer 26.

Multiplexer (MUX) 26 also receives memory plane designation data 23 in the same manner as in multiplexer 22. Multiplexer 26 generates 1-bit mask data selected on the basis of memory plane designation data 23 and the selected data is output to mask circuit 27.

Mask circuit 27 receives 16-bit comparison results from comparator 24 and the mask data from multiplexer 26. Mask circuit 27 comprises sixteen 2-input OR gates. Each bit of the 16-bit boundary data from comparator 24 is input to one terminal of a corresponding one of the OR gates, and the bit mask data from multiplexer 26 is supplied to the other input terminal of each of the OR gates. Each gate generates an OR signal. Therefore, when multiplexer 26 generates the mask data of logic "1", this mask data is supplied as the boundary data to registers 28-0 to 28-3. However, if the logic level of the mask data is "0", the boundary data from comparator 24 is output to registers 28-0 to 28-3.

Decoder (DCDR) 29 receives memory plane designation data 23 through system bus 12 and read memory signal 30 representing access of frame memory 13. When signal 30 is disabled, decoder 29 decodes designation data 23. Decoded data 23 is input as a clock signal to clock terminals of registers 28-0 to 28-3. Registers 28-0 to 28-3 latch 16-bit boundary data from mask circuit 27 in response to the clock signal. Boundary data corresponding to the 16-bit image data from memory planes 13-0 to 13-3 and displayed at an identical position of CRT 16 is stored in registers 28-0 to 28-3. The stored boundary data is output to detector 31.

Detector 31 comprises sixteen 4-input AND gates 31-0 to 31-15. Each AND gate 31-i (i=0 to 15) receives the ith bit of the 16-bit output data from registers 28-0 to 28-3 and generates an AND signal. If all bits of the input data are logic "1", an output is set at logic "1". If one of the bits is logic "0", the output is set at logic "0". In this manner, detector 31 uses the boundary data for each memory plane of the registers 28-0 to 28-3 and generates boundary data for frame memory 13 bit by bit. The boundary data prepared for frame memory 13 is supplied to priority circuit 32.

2-bit detection mode designation data for designating the operation mode of priority circuit 32 is input to register (REG) 33 through system bus 12 and stored therein. The detection mode designation data comprises direction designation bit D for designating a direction of a boundary position detection in priority circuit 32 and logic value designation bit T for designating logic to be "0" or "1" for detecting the boundary bit position. The detection mode designation data is supplied to priority circuit 32.

Priority circuit 32 receives 16-bit boundary data to be supplied from detector 31 to frame memory 13 and detects the boundary bit position according to the detection mode designation data from register 33. The detected boundary bit position data is output as 5-bit binary data to CPU 11 through system bus 12.

The operation of the first embodiment of the present invention will be described below.

In this embodiment, boundary detection for graphic painting will be described. In general, in order to detect a boundary for painting, the presence/absence of a boundary to the right or left of the start pixel of interest must be determined. The following two boundary detection schemes can be employed in this embodiment: (1) a scheme in which a pixel having the same color information as that of the start pixel is defined to fall within a region of interest and a pixel having color information different from that of the start pixel is defined to fall outside the region of interest; and (2) a scheme in which a pixel having the same color information as that of the start pixel is defined to fall outside a region of interest and a pixel having color information different from that of the start pixel is defined to fall within the region of interest.

First, image data is input from a host computer (not shown) to the bit-map graphic processing system through host interface 15. The input image data is written in memory planes 13-0 to 13-3 of frame memory 13 under the control of CPU 11. CRT 16 reads out the image data from frame memory 13 and displays the image data on the screen thereof.

It is assumed that a painting instruction employing scheme (1) described above and start pixel designation data are input to CPU 11 via host interface 15. CPU 11 outputs the boundary detection processing control instruction to boundary detector 14 in accordance with the painting instruction. If scheme (1) is employed, CPU 11 sets 4-bit boundary condition data determined by the start pixel in boundary detection processing. The bits of the boundary condition data correspond to the memory planes, respectively. CPU 11 sets 4-bit mask data for designating memory planes excluded as ones subjected to boundary detection processing as the boundary detection processing control instruction. This 4-bit mask data is set in register 25.

2-bit detection mode designation data is output to register 33 as the boundary detection processing control instruction according to boundary detection processing. Logic value designation data T of the detection mode designation data is set at logic "0" during boundary detection processing employing scheme (1). The direction designation data is determined by a direction of boundary detection processing. If a boundary is to be searched in the left direction of the screen, i.e., if a boundary in output data from detector 31 is to be searched from the LSB position toward the MSB direction, direction designation data D of the detection mode designation data is set at logic "1". However, if a boundary in the right direction of the screen is to be searched, i.e., if a boundary in output data from detector 31 is to be searched from the MSB position toward the LSB direction, data D is set at logic "0". In this manner, the detection mode designation data is output to register 33 every time the direction of boundary detection processing is switched.

When CPU 11 read-accesses one of the memory planes in frame memory 13 using the input start pixel as a reference, 16-bit image data having a start position corresponding to the start pixel is read out from the accessed memory plane onto system bus 12. Read access is performed by causing CPU 11 to output, on system bus 12, an address representing a start pixel within the memory plane of interest in frame memory 13 and memory read signal 30.

Memory plane designation data 23 on system bus 12 is commonly supplied to multiplexers 22 and 26. The boundary condition data set in register 21 is supplied to multiplexer 22. The mask data stored in register 25 is supplied to multiplexer 26. Multiplexer 22 selects 1-bit boundary condition data corresponding to the memory plane from the 4-bit boundary condition data supplied from register 21 according to memory plane designation data 23. The boundary condition data selected by multiplexer 22 is supplied to comparator 24.

16-bit image data from the memory plane designated by memory plane designation data 23 is also supplied to comparator 24 through system bus 12. Comparator 24 compares each bit of the 16-bit image data from frame memory 13 with the boundary condition data selected by multiplexer 22. If these input signals coincide with each other, comparator 24 generates bit data of logic "1". Otherwise, comparator 24 generates bit data of logic "0". These comparison results are generated bit by bit. The 16-bit comparison results from comparator 24 is supplied as the boundary data to mask circuit 27.

The mask circuit 27 also receives the mask data selected by multiplexer 26. If the mask data from multiplexer 26 is logic "0", i.e., if the read-accessed memory plane is an object subjected to boundary detection processing, the comparison result from the comparator 24 is output as boundary data. However, if the mask data is logic "1", i.e., if the read-accessed memory plane is not an object subjected to boundary detection processing, 16-bit data having bits of all logic "1"s (i.e,. a coincidence with the boundary condition data) is output as the boundary data. The 16-bit output data from mask circuit 27 is commonly supplied as the boundary data to registers 28-0 to 28-3.

Memory plane designation data 23 and memory read signal 30 on system bus 12 are also supplied to decoder 29. Decoder 29 decodes memory plane designation data 23 at the end of read access, i.e., a timing when memory read signal 30 is disabled. The decoded results are supplied as a clock signal to registers 28-0 to 28-3. Therefore, the boundary data from mask circuit 27 is latched by registers 28-0 to 28-3 corresponding to the memory plane designated by the memory plane designation data 23.

CPU 11 continues read access of memory planes 13-0 to 13-3 of frame memory 13 at an identical data position on the screen by updating memory plane designation data 23. When read access of the image data at the identical data positions of memory planes 13-0 to 13-3 is completed, boundary data for each of memory planes 13-0 to 13-3 is loaded. In this case, if the memory plane designated by memory plane designation data 23 is an object subjected to boundary detection processing, the comparison result between the image data at the identical positions of memory planes 13-0 to 13-3 and the boundary condition data of the corresponding memory planes is loaded. However, if the memory plane of interest is one excluded from boundary detection processing, 16-bit data having all logic "1"s is loaded.

The 0th bit of the 16-bit data from registers 28-0 to 28-3 is supplied to AND gate 31-0 of detector 31; the first bit to AND gate 31-1,... and the 15th bit is supplied to AND gate 31-15. AND gate 31-i (i=1 to 15) generates an AND signal of the ith bits of outputs from registers 28-0 to 28-3. An output bit from AND gate 31-i is set at logic "1" if the ith bits of the data at identical positions from memory planes 13-0 to 13-3 respectively correspond to the plane boundary conditions. Otherwise, the output bit from AND gate 31-i is set at logic "0". The output bits from AND gates 31-0 to 31-15 are supplied as boundary data for frame memory 13 to the 0th to 15th bit positions of priority circuit 32. 2-bit-detection mode designation data set in register 33 is also supplied to priority circuit 32. Priority circuit 32 detects the boundary bit position according to the detection mode data and generates 5-bit boundary bit position data.

The operation of priority circuit 32 will be described with reference to FIGS. 4A to 4D. Priority circuit 32 detects a "0" or "1" bit position nearest to the LSB or MSB of the boundary data to be supplied from detector 31 to frame memory 13 according to the detection mode designation data from register 33 and generates the detected bit position as the boundary bit position data onto system bus 12.

(A) If logic value designation bit data T and direction designation bit data D which constitute the detection mode designation data are given as T=0 and D=0, respectively, priority circuit 32 outputs data (one of value 0 to value 15) representing the bit position where the logic "0" first appears from the MSB position toward the LSB direction in the 16-bit output data from detector 31. As shown in FIG. 4A, if all bits are set at logic "0", the boundary bit position data is "15". As shown in FIG. 4B, if all bits are set at logic "1", the boundary is not detected, and the boundary bit position data represents "16". If the boundary data are given as shown in FIGS. 4C and 4D, respectively, they represent "15" and "10", respectively.

(B) If logic value designation bit data T and direction designation bit data D are given as T=0 and D=1, respectively, priority circuit 32 generates data (one of value 0 to value 15) representing a bit position where logic "0" first appears from the LSB position toward the MSB direction in the 16-bit output data from detector 31. As shown in FIG. 4A, if all bits are set at logic "0", the boundary bit position data is set at logic "0". However, if all bits are set at logic "1", as shown in FIG. 4B, the boundary is not detected, and the boundary bit position data represents "16". However, if the boundary data are given, as shown in FIGS. 4C and 4D, the boundary bit position data represent "4" and "0", respectively.

(C) If logic value designation bit data T and direction designation bit data D are T=1 and D=0, respectively, priority circuit 32 generates data (one of value 0 to value 15) representing a bit position where logic "1" first appears from the MSB position toward the LSB direction in the 16-bit output data from the detector 31. As shown in FIG. 4A, if all bits are set at logic "0", the boundary is not detected and the boundary bit position data represents "16". However, as shown in FIG. 4B, if all bits are logic "1", the boundary bit position data represents "15". Moreover, if boundary data are given as shown in FIGS. 4C and 4D, respectively, the boundary bit position data represent "13" and "15", respectively.

(D) If logic value designation bit data T and direction designation bit data D are T=1 and D=1, respectively, priority circuit 32 generates data (one of value 0 to value 15) representing a bit position where logic "1" first appears from the LSB position toward the MSB direction in the 16-bit output data from detector 31. As shown in FIG. 4A, if all bits are logic "0", the boundary is not detected and the boundary bit position data represents "16". However, as shown in FIG. 4B, if all bits are set at logic "1", the boundary bit position data is set at logic "0". If the boundary data are given as shown in FIGS. 4C and 4D, respectively, the boundary bit position data represent "0" and "9", respectively.

When CPU 11 completes read access of identical data positions of memory planes 13-0 to 13-3, the output data from priority circuit 32, i.e., the boundary bit position data is fetched by CPU 11 through system bus 12. CPU 11 discriminates that the boundary has been detected on the basis of the boundary bit position data. If no boundary is present, the image data read address is updated on the basis of the boundary bit position data. The next 16-bit image data is read out, and the above boundary detection processing is repeated. If the boundary is not detected according to scheme (1), CPU 11 sets bits of positions corresponding to the 16-bit image data of the memory plane associated with the color designated by the painting instruction.

If the boundary is detected, the pixel position represented by the boundary position data is stored in a stack (not shown) in the same manner as in the conventional arrangement. CPU 11 sets bits up to the boundary bit position of the bit positions corresponding to the 16-bit image data in the search direction. CPU 11 determines whether the stored boundary pixels are continuous with other boundary pixels. In order to detect boundary pixels adjacent to the discontinuous boundary pixel, new 16-bit image data are sequentially read out from the four memory planes of frame memory 13 as the discontinuous boundary pixel, or a upper or lower pixel thereof is a start bit position, according to the already detected boundary pixel, and the operation as described above will be performed.

The region up to the boundary detected in response to the painting instruction can be painted as described above. In this case, CPU 11 outputs detection mode designation data to register 33 according to the search direction.

According to this embodiment as described above, the boundary detector of the present invention is simply added to the conventional graphic processing system to achieve high-speed boundary detection.

A boundary detector and a bit-map graphic processing system incorporating the boundary detector according to a second embodiment of the present invention will be described with reference to FIGS. 5 to 7.

Figure 7:
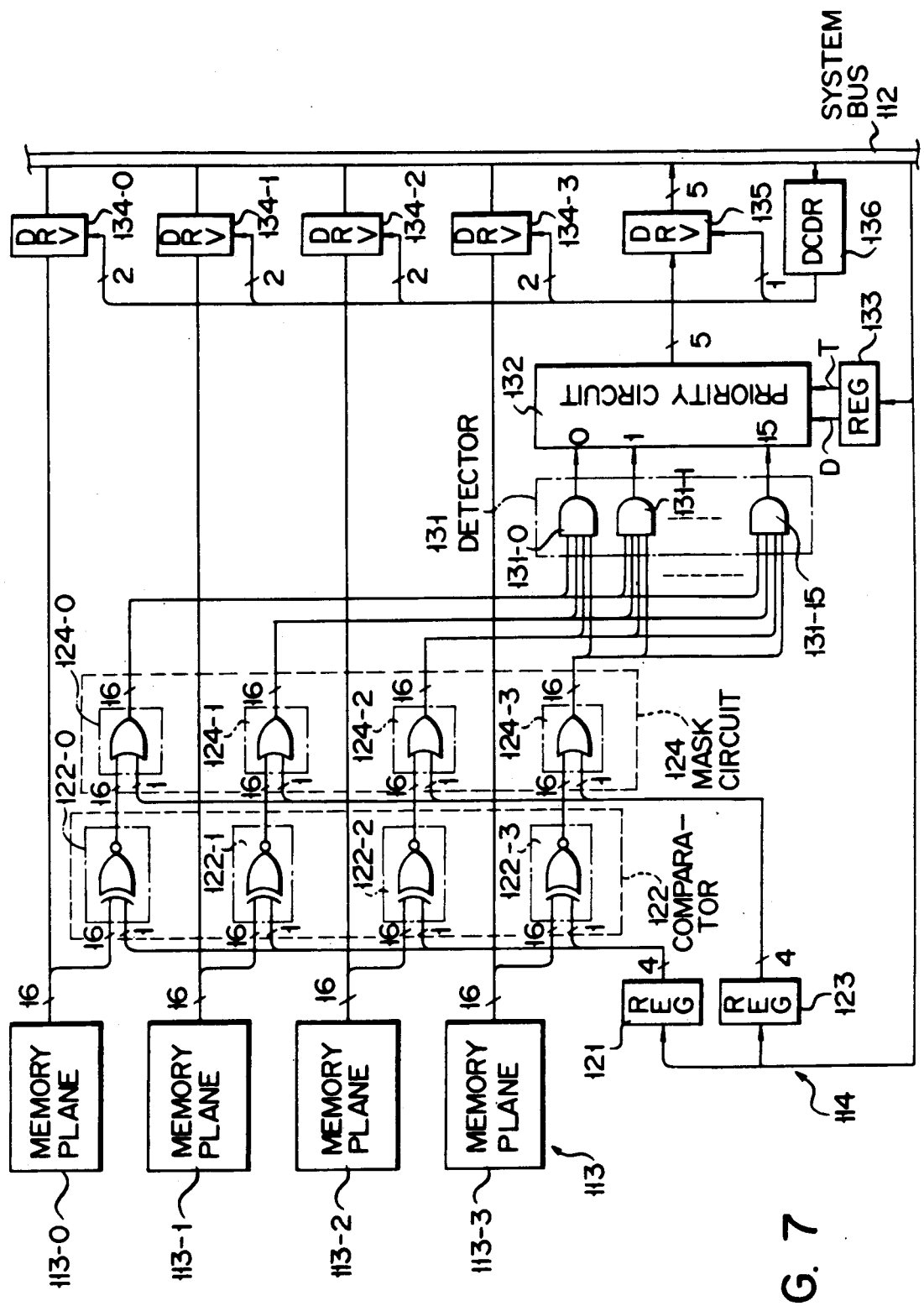
FIG. 7 is a block diagram showing a detailed arrangement of the boundary detector shown in FIG. 5.

FIG. 5 is a block diagram of a bit-map graphic processing system incorporating a boundary detector according to the second embodiment, and FIG. 7 is a block diagram showing a detailed arrangement of boundary detector 114 shown in FIG. 5.

Referring to FIG. 5, system bus 112 is connected to CPU 111, frame memory 113 consisting of four memory planes 113-0 to 113-3 in the same manner as in frame memory 13 of the first embodiment, boundary detector 114, and host interface 115 serving as an interface with a host computer (not shown). Boundary detector 114 is also connected to memory planes 113-0 to 113-3 of frame memory 113.

Frame memory 113 is connected to CRT 116. Image data is read out from memory planes 113-0 to 113-3 in frame memory 113 and is displayed on CRT 116.

When an instruction requiring boundary detection processing is received, CPU 111 outputs a boundary detection processing control instruction to boundary detector 114. Boundary detector 114 performs boundary detection processing for 16-bit image data corresponding to identical data positions of memory planes 113-0 to 113-3 in frame memory 113 and generates boundary bit data to CPU 111.

Figure 6:
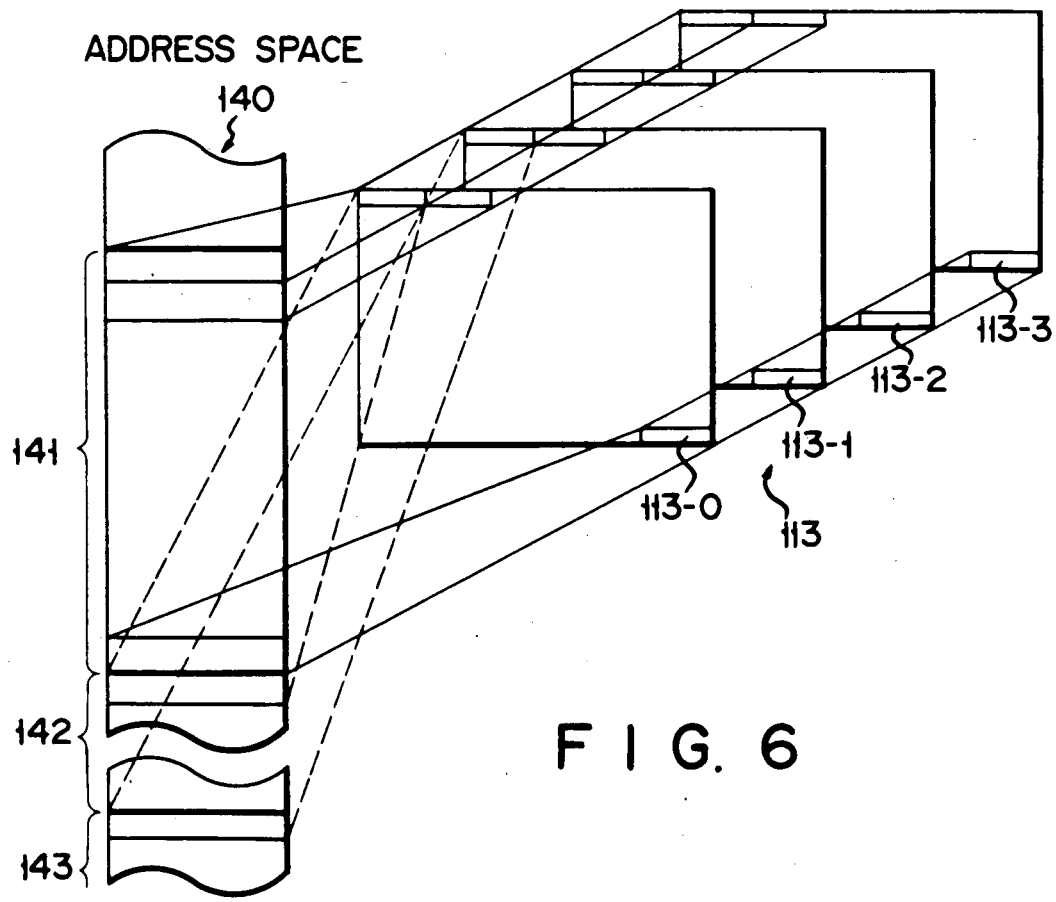
FIG. 6 is a memory map showing the address space of a frame memory shown in FIG. 5.

FIG. 6 shows an address structure of frame memory 113. Pixels of each memory plane 113-i (i=0 to 3) are accessed in units of bits. In this embodiment, the address areas of memory planes 113-0 to 113-3 have a double structure. More specifically, when memory planes 113-0 to 113-3 are accessed to perform boundary detection processing, the address areas of memory planes 113-0 to 113-3 are commonly assigned to predetermined region 141 of address space 140. However, if memory planes 113-0 to 113-3 are normally accessed, the address areas of memory planes 113-0 to 113-3 are assigned to the continuous four regions having an identical size different from address region 141 in address space 140. For example, address region 142 is assigned to memory plane 113-0.

The arrangement of boundary detector 114 according to the second embodiment will be described with reference to FIG. 7.

Referring to FIG. 7, 4-bit register (REG) 121 receives and stores boundary condition data for memory planes 113-0 to 113-3 from CPU 111 through system bus 112. Comparator network 122 comprises four comparators 122-0 to 122-3. The arrangement of each comparator 122-i (i=0 to 3) is the same as that of comparator 24 in the first embodiment. Comparator 122-i (i=0 to 3) compares each bit of the 16-bit image data read out from memory plane 113-i with the corresponding boundary condition data from boundary condition register 121 and generates boundary data corresponding to memory plane 113-i.

Register (REG) 123 receives and stores mask data from CPU 111 through system bus 112. Mask network 124 comprises four mask circuits 124-0 to 124-3. Each mask circuit 124-i (i=0 to 3) has the same arrangement as mask circuit 27 of the first embodiment. Each mask 124-i (i=0 to 3) masks each bit of the 16-bit boundary data from the corresponding comparator 122-i in accordance with the mask bit data associated with the corresponding memory plane 13-i and included in the mask data stored in register 123.

The arrangement of detector 131 is the same as that of detector 31 of the first embodiment and comprises sixteen 4-input AND gates 131-i (i=0 to 15). Each detector 131-i detects whether the logic values of bits of the identical positions in the output data from the corresponding mask circuit 124-i (i=0 to 3) coincide with each other (i.e., logic "1") bit by bit.

The arrangement of register 133 is the same as that of register 33 of the first embodiment and is designed to output, to priority circuit 132, detection mode designation data received through system bus 112. The arrangement of priority circuit 132 is the same as that of priority circuit 32 of the first embodiment. Priority circuit 132 detects a boundary bit position from the boundary data supplied from detector 131 to the frame memory, and outputs boundary bit position data to CPU 111 through system bus 112.

Bidirectional driver (DRV) 134-i (i=0 to 3) interfaces between system bus 112 and memory plane 113-i. Bus driver (DRV) 135 transmits output data from priority circuit 132 to system bus 112. Decoder 136 decodes a memory read signal, a memory write signal, and address data which are transferred through system bus 112 and generates various control signals for controlling drivers 134-i (i=0 to 3) and 135.

In this embodiment, if address data on system bus 112 accesses an address area inherent to memory plane 113-i (i=0 to 3), decoder 136 outputs a control signal for setting bus driver 134-1 in the output enable stat in the read access mode. However, in the write access mode, decoder 136 outputs a control signal for setting bus driver 134-i in the input enable state. These control signals are supplied to driver 134-i. When address data on system bus 112 designates common address region 141 (FIG. 6) of memory planes 113-0 to 113-3 in the read access mode, decoder 136 outputs a control signal to driver 135 such that bus driver 135 is set in the output enable state.

The operation of the boundary detector according to the second embodiment will be described below.

In order to detect a boundary for graphic painting, two schemes (1) and (2) are available, as described with reference to the first embodiment. These two schemes can be selectively used in the second embodiment. It is assumed that scheme (1) is used in the second embodiment.

When an instruction requiring boundary detection processing such as painting and a start pixel are input to CPU 111, CPU 111 outputs a boundary detection processing control instruction including boundary condition data, mask data, and detection mode designation data to registers 121, 123, and 133. The boundary condition data, the mask data, and the detection mode designation data are the same as those in the first embodiment.

CPU 111 accesses frame memory 113 so as to read out 16-bit image data having a start bit position corresponding to the input start pixel in the search direction. 16-bit image data at identical data positions of memory planes 113-i (i=0 to 3) in frame memory 113 are simultaneously read out. The readout image data are respectively supplied to comparators 122-0 to 122-3. Each comparator 122-i (i=0 to 3) also receives the corresponding boundary condition data of the boundary condition data set in register 121. Each comparator 122-i (i=0 to 3) generates boundary data for the corresponding memory plane 113-i (i=0 to 3) on the basis of the bit boundary condition data corresponding to the input image data in the same manner as in the first embodiment. The comparison results from comparators 122-i (i=0 to 3) are supplied to mask circuits 124-i (i=0 to 3), respectively. Each mask circuit 124-i (i=0 to 3) receives the corresponding bit mask data stored in register 123. Each mask circuit 124-i (i=0 to 3) outputs, to detector 131, the boundary data having masked boundary data corresponding to memory planes not subjected to boundary detection processing.

Each AND gate 131-i (i=1 to 15) in detector 131 calculates an AND signal of the ith bits of the outputs from mask circuits 124-i (i=0 to 3). An output bit from AND gate 131-i (i=0 to 15) is set at logic "1" when the ith bits of the boundary data corresponding to memory planes 113-0 to 113-3 are set at logic "1". Otherwise, the ith bit is set at logic "0". Output bits from AND gates 131-i (i=0 to 15) are supplied as boundary data for frame memory 113 to priority circuit 132.

Priority circuit 132 receives 2-bit detection mode designation data stored in register 133. Priority circuit 132 outputs boundary bit position data in the same manner as in priority circuit 32 of the first embodiment.

The output data from priority circuit 132, i.e., the boundary bit position data is supplied to bus driver 135. A control signal output from decoder 136 at a timing when the memory read signal is disabled in the read access mode during boundary detection processing is supplied to bus driver 135. Driver 135 is set in the output enable state in response to this control signal and outputs the boundary bit position data from priority circuit 132 onto system bus 112. CPU 111 fetches the boundary bit position data from system bus 112 and reads it in the same manner in individual read access of memory planes 113-0 to 113-3 in frame memory 113. CPU 111 determines whether the boundary is present (i.e., a value represented by the boundary bit position data is less than 16) or not (a value represented by the boundary bit position data is 16), i.e., whether the data is present within the region. If the data is discriminated to fall within the region, the image data read out from the memory plane associated with the color designated by the painting instruction is set at logic "1". However, if the boundary is detected, and boundary bit position is stored in a stack (not shown) and the image data up to the boundary bit position in the search direction is set at logic "1".

Thereafter, CPU 111 determines an address of the next 16-bit image data on the basis of the boundary bit position data in the same manner in the first embodiment. More specifically, if the boundary is detected, the pixel of the upper or lower position of the bit position of interest is given as the start pixel so as to determine the address. However, if the boundary is not detected, the pixel of the next position of the readout image data in the search direction is used to determine the address. CPU 111 simultaneously read-accesses the four memory planes on the basis of the updated address. Thereafter, the above operation is repeated. In this manner, the boundary is detected and the designated region is painted.

According to the second embodiment as described above, the boundary can be detected faster than that in the first embodiment.

In the first and second embodiments, scheme (1) is used. However, if scheme (2) is employed, a noncoincidence bit of the boundary data is discriminated as the boundary unlike in scheme (1). Therefore, the logic value designation data of the detection mode designation data is set at logic "0". The region not to be painted in the first embodiment is painted in the second embodiment. Other operations are identical in the first and second embodiments. If one of schemes (1) and (2) is employed, logic value designation bit T may be omitted from the detection mode designation data.

In the above embodiments, boundary detection processing for region painting is exemplified. However the present invention is also applicable to other processing such as detection of a display area of a graphic pattern and checking of an overlapping portion.

What is claimed is:

1. AN image data processing system, comprising:
control means, responsive to an input boundary detection command and a first pixel position, for determining a position of a boundary pixel of the image data having a predesignated logic value, for generating inversion control data in accordance with the predesignated logic value data, for generating read pixel position data in accordance with whether the position determination has been made and for generating boundary detection condition data including logic level designation data and direction designation data, the direction designation data being generated in accordance with the read pixel position data and the first pixel position data, the logic level designation data being generated in accordance with the predesignated logic value data;

frame memory means for storing monocolor image data, the image data including area image data representing an area of said monocolor image data and for generating an image data block from the image data in response to the read pixel position data;

inverting means for generating conversion data by selectively inverting the logic value of each pixel of the image, data block from said frame memory means in accordance with the inversion control data from said control means;

search means for searching the conversion data from said inverting means for a boundary pixel in accordance with the boundary detection condition data from said control means, for detecting the position of the boundary pixel in accordance with the search result and for outputting detection position data indicating whether the boundary pixel is detected to said control means, wherein when the detection position data indicates that the boundary pixel is detected, said search means outputs the position of the boundary pixel in the image data block.

2. A system according to claim 1, wherein said inverting means includes a plurality of not-exclusive OR circuits, each for receiving a corresponding pixel of the image data block represented by a logic value and selectively inverting the logic value of the corresponding pixel in accordance with the invention control data from said control means.

3. A system according to claim 1, wherein said control means further includes means for inhibiting the boundary detection condition data from being generated when the boundary pixel position is not detected.

4. A system according to claim 1, further including filling means for setting a logic value of each pixel from the start pixel of the image data block to the boundary pixel in a direction corresponding to the direction indicated by the direction designation data to a predetermined logic value.

5. An image data processing system, comprising:
control means, responsive to an input boundary detection command, for generating and outputting block read data;
memory means including a given number of frame memory means for storing image data and for generating image data blocks from the image data in response to block read data input from said control means, a color image data block being formed by the given number of image data blocks,
said control means having means for generating logic value inverting data and logic value designation data in accordance with a color of a boundary pixel to be detected within the color image data block;
inverting means for receiving the given number of image data blocks from said frame memory means and selectively inverting a logic value of each pixel of the given number of image data blocks in accordance with the logic value inverting data from said control means to generate the given number of sets of inverted data;
operation means for performing logical AND operation on the logic values of a given number of bits from corresponding bit positions from each of the given number of sets of inverted data to obtain boundary indication data; and
detecting means for detecting a boundary pixel from the boundary indication data in accordance with the logic value designation data from said control means to generate boundary pixel position data.

6. A system according to claim 5, wherein said control means includes means for generating mask data and said inverting means includes masking means for selectively setting the logic value of each pixel of selected image data blocks of a color image data block to a predetermined logic value in accordance with the mask data.

7. A system according to claim 5, wherein said control means includes means for generating direction designation data and said detecting means includes means for detecting the boundary pixel from the boundary indication data in a direction designated by the direction designation data.

8. A system according to claim 5, wherein each of said given number of frame memory means are assigned to the same address space so that the given number of image data blocks are output simultaneously in response to the block read data.

9. A system according to claim 5, wherein each of said given number of frame memory means are assigned to different address spaces and sequentially output the given number of image data blocks in response to the block read data.

10. In an image data processing system, a method of detecting a boundary pixel of an area, comprising the steps of:
generating block read data in response to a boundary detection command;
reading out a given number of image data blocks of image data from a memory in response to the block read data, a color image data block being constituted by the given number of image data blocks;
generating, in response to a color of a boundary pixel, logic value inverting data;
selectively inverting a logic value of each pixel of the given number of image data blocks in accordance with the logic value inverting data to generate a given number of bits of inverted data corresponding to each bit position of the given number of image data blocks;
performing a logical AND operation on the logic values of corresponding pixels of the given number of bits of inverted data corresponding to each bit position of the given number of image data blocks to obtain boundary indication data having the same number of bits as each image data block;
generating logic value designation data in accordance with the color of the boundary pixel; and
detecting the boundary pixel from the boundary indication data in accordance with the logic value designation data to generate boundary pixel position data.

11. A method according to claim 10, wherein said inverting step includes the substeps of:
generating mask data; and
selectively setting the logic value of each pixel of selected ones of the given number of image data blocks to a predetermined logic value in units of image data blocks in accordance with the mask data.

12. A method according to claim 11, wherein said detecting step includes the substeps of:
generating direction designation data; and
detecting the boundary pixel from the boundary indication data in a direction designated by the direction designation data.

13. A method according to claim 10, wherein the memory includes a given number of frame memories for storing bits of image data, the given number of frame memories are assigned to the same address space and said reading out step includes the substep of reading out the given number of image data blocks at the same time in response to the block read data.

14. A method according to claim 10, wherein the memory includes a given number of frame memories for storing bits of image data, the given number of frame memories being assigned to different address spaces and said reading out step includes the substep of sequentially reading out the given number of image data blocks in response to the block read data.

15. A method according to claim 10, wherein said step of generating the block read data includes the substep of generating the block read data for a next given number of image data blocks in accordance with the boundary pixel position data.

16. A method according to claim 10, including the steps of generating direction designation data and setting a logic value of each pixel from first pixels, as determined by the direction designation data, of the given number of image data blocks to pixels corresponding to the boundary pixel to a second predetermined logic value to paint the area.

17. An apparatus for processing image data being comprised of a plurality of segments for an image comprising:
 a frame memory having means for storing image data and means for outputting a first selected segment of said image data;
 means for generating boundary condition data, said boundary condition data indicating a condition of said image data;
 means for respectively comparing a second predetermined selected segment of said image data to said boundary condition data to determine a coincidence between the indicated condition and the data in said second predetermined selected segment of said image data and for generating boundary data corresponding to the determinations of coincidence of the data in said second predetermined selected segment of said image data;
 means for detecting a boundary in said second predetermined selected segment of said image data in response to said boundary data and for outputting the position of said boundary in said second predetermined selected segment of said image data.

18. An apparatus as claimed in claim 17,
 wherein said frame memory stores image information for a multicolor image and includes a plurality of image data storing means, each of which stores one plane of image information corresponding to a color of said multicolor image;
 wherein said boundary condition data indicates a condition for each of said plurality of image data storing means; and
 further including means for generating mask data, said mask data designating ones of said planes of image information subject to boundary detection by said boundary detecting means.

* * * * *

UNITED STATES PATENT AND TRADEMARK OFFICE
CERTIFICATE OF CORRECTION

PATENT NO.   :   5,050,097
DATED        :   September 17, 1991
INVENTOR(S)  :   Kouki HASEBE It is certified that error appears in the above-identified patent and that said Letters Patent is hereby corrected as shown below:

Claim 1, column 12, line 30, change "AN" to --An--.

Claim 2, column 13, line 8, change "invention" to --inversion--.

Signed and Sealed this

Thirteenth Day of April, 1993

Attest:

STEPHEN G. KUNIN

Attesting Officer

Acting Commissioner of Patents and Trademarks